May 12, 1936. E. H. ELLMS 2,040,084
EXTRACTION OF TAR ACIDS
Filed Jan. 12, 1932
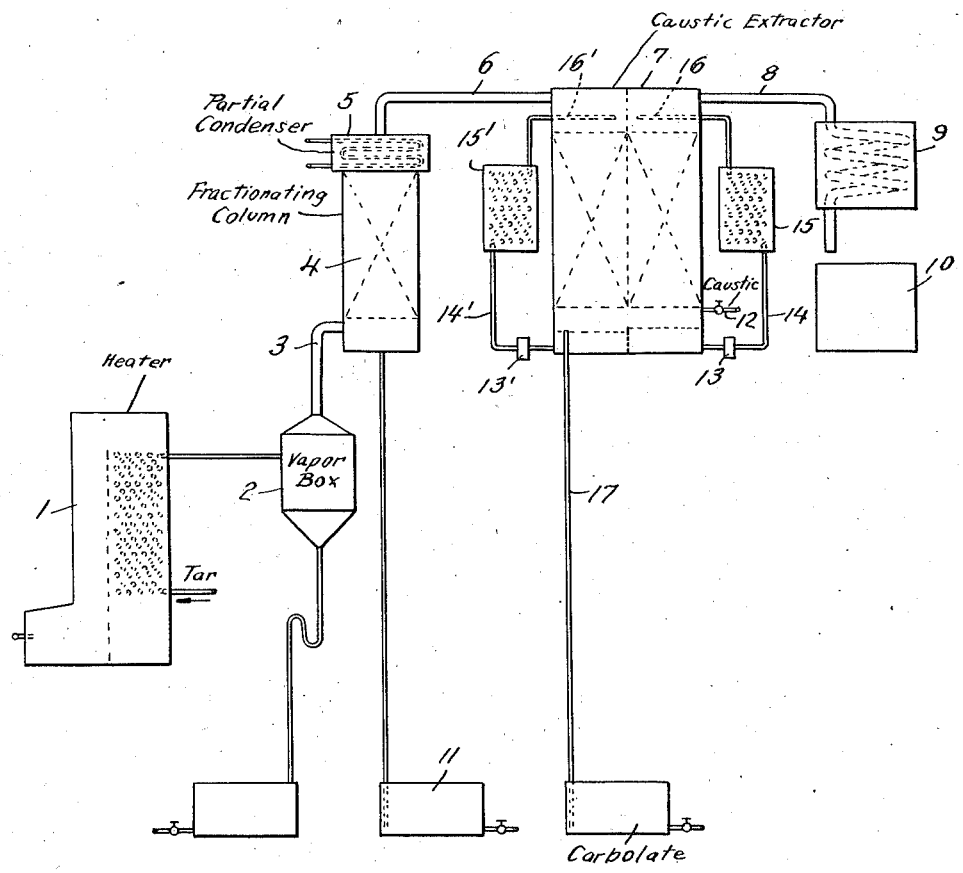
INVENTOR
Edward H Ellms
BY
Pennie Davis Marvin Edmonds
ATTORNEYS Patented May 12, 1936

2,040,084

UNITED STATES PATENT OFFICE 2,040,084

EXTRACTION OF TAR ACIDS

Edward H. Ellms, Fairlawn, N. J., assignor to The Barrett Company, New York, N. Y., a corporation of New Jersey Application January 12, 1932, Serial No. 586,194

12 Claims. (Cl. 260—154)

This invention relates to the process of extracting tar acids from tar-acid-containing vapors with concentrated solutions of alkaline reagents, such as caustic soda, to produce concentrated solutions of tar-acid salts, referred to herein as "carbolate solutions". It also includes the improved concentrated carbolate solutions produced by such vapor-phase extraction.

By the vapor-phase extraction of tar acids is meant the recovery of tar acids as carbolate by converting tar-acid vapors produced by the distillation of tar-acid-containing material, such as tar, or tar distillate, etc., to carbolates by bringing them into contact with an alkaline reagent while they are still in the vapor state. The vapor-phase extraction of tar acids is not new in the art but it is new to use concentrated solutions of caustic for extraction in the vapor-phase, and the production of concentrated carbolate solutions by vapor-phase extraction is new.

It is the general custom at the present time to prepare carbolate solutions by treating tar-acid containing oils with an alkaline solution; these oils may be condensates obtained from the distillation of tar or other tar-acid containing material. Caustic soda is ordinarily employed for this extraction, although sodium sulfide, etc., may be employed. In many cases the tar-acid oils are extracted at the tar distillation plant and the resulting carbolate solution is shipped to a tar-acid-refining plant at which the tar acids are liberated from the carbolate solution and refined by suitable processes. The cost of transporting carbolate solutions from tar distillation plants to the refining plant is a considerable item in the cost of the tar acids. It is therefore desirable and is one of the objects of this invention to make carbolate solutions with a high percentage by volume of tar acids, which can be transported at less cost per unit of tar acids than solutions of lower concentration. The percentage by volume of tar acids in a carbolate solution as here used refers to the percentage by volume of dry distilled tar acids (i. e., free from water, distillation residue, oil and naphthalene) that can be obtained from that carbolate. "Dry crude tar acids" as used in the specification and claims includes dry distilled tar acids and distillation residue.

The concentrated carbolate solutions of this invention contain at least 45% and preferably 55%, or more of tar acids and they may contain an excess of caustic soda but preferably 85% or more of the total soda present has been converted into carbolates.

The composition of the carbolate solutions is in part determined by condensation of neutral oil, water, etc., from the vapors being treated.

Carbolates produced by this process will ordinarily contain 3% or more excess caustic soda. This excess of caustic soda is of advantage in effecting a high percentage of removal of tar acids from the gas stream. It is also of advantage in that it prevents loss of tar acids, or obviates the necessity of adding excess caustic soda to prevent such loss, when the carbolate is heated or steamed to distill off uncombined neutral oil before the liberation of tar acids. By "excess caustic soda" is meant that which is present in excess of the calculated amount equivalent to the acids or acid radicals present in the carbolate, such as tar acids and, in smaller amounts, carbonic, hydrocyanic hydrosulfuric acids or radicals.

More neutral oil dissolves in the carbolates formed by vapor-phase extraction than corresponds to condensation of oil due only to a drop in temperature of the vapors treated. For example, the gas before extracting with caustic may be reheated a few degrees and treated with caustic solution of such strength and at such temperature that the system remains several degrees above the normal condensation temperature for the neutral-oil vapors. Under these conditions the carbolate produced will contain some neutral oil owing to the fact that the vapor pressure of oil dissolved in carbolate is less than the vapor pressure of the oil in the gas stream, causing some oil to dissolve.

The carbolates produced by the process of this invention contain dissolved neutral oils. However the process is so regulated as to prevent the condensation of neutral oil in excess of the amount that will dissolve in the carbolate. If the extraction is so regulated that the gas is not cooled more than 10° C. when in contact with the caustic, the carbolate formed will contain on the average between 10 and 15% by volume of dissolved oil. Although this may be exceeded in some cases, the oil content may easily be reduced to below 10% by proper regulation to limit the cooling of the gas. This oil will dissolve in the carbolate. Generally up to about 20% of oil will dissolve in carbolate without forming a separate layer.

The dissolved oil is of benefit in handling concentrated carbolates since it lowers the melting or softening point of the carbolate and increases its fluidity. This is an aid in pumping the carbolate to and from tanks and tank cars. The presence of oil also aids in remelting solidified carbolate before removal from tanks and tank cars.

The oil dissolved in vapor-extraction carbolate is a higher boiling oil than the oil normally dissolved in carbolate made by the liquid-extraction process, since at the high temperature of production the lower boiling oils present in carbolate produced by ordinary liquid extraction, tend to remain in vapor form. Furthermore, the character of the oil in the vapors treated by vapor extraction may be different from an ordinary carbolic oil treated by liquid extraction. To illustrate, the tests of three dissolved oils are given below, the first two of which are tests of oils dissolved in vapor-extraction carbolate and the third, the test of an oil dissolved in the carbolate made by treating a typical "carbolic oil" by liquid extraction at about 70° C.

*Boiling range of oils dissolved in carbolate*

| Percentage distilled | Vapor-extraction carbolate No. 1 | Vapor-extraction carbolate No. 2 | Typical liquid-extraction carbolate |
|---|---|---|---|
| Start | 210 | 218 | 208 |
| 5% | 225 | 227 | 215 |
| 10 | 232 | 235 | 219 |
| 20 | 245 | 243 | 230 |
| 30 | 258 | 253 | 237 |
| 40 | 273 | 268 | 245 |
| 50 | 290 | 282 | 256 |
| 60 | 310 | 300 | 275 |
| 70 | 321 | 323 | 302 |
| 80 | 334 | 337 | 325 |
| 90 | 348 | 357 |  |
| Decomposition temperature | 350 | 362 | 325 |
| Percent off at decomposition temperature | 91 | 92 | 87 |

The boiling temperatures of the oils from vapor-extraction carbolate are from 8 to 35° C. higher for a given percentage distilled than the corresponding boiling temperatures of the oil from an ordinary liquid extraction carbolate. The oil dissolved in liquid-extraction carbolate boils at least 50% off at 265° C. whereas the oil from the vapor extraction carbolate ordinarily boils less than 50% off at 265° C. and more generally less than 40% as in the examples cited.

The carbolates from which the dissolved oils were taken and tested as above contained tar acids having the boiling ranges given below.

*Boiling range of tar acids from carbolate*

| Percentage distilled | Vapor-extraction carbolate No. 2 | Typical liquid-extraction carbolate |
|---|---|---|
| Start | 191.0 | 189.0 |
| 5% | 195.0 | 193.0 |
| 10 | 197.0 | 194.8 |
| 20 | 198.6 | 198.5 |
| 30 | 200.0 | 202.0 |
| 40 | 201.6 | 205.4 |
| 50 | 204.0 | 210.4 |
| 60 | 207.0 | 220.0 |
| 70 | 211.8 | 229.0 |
| 80 | 224.0 | 280. |
| 90 | 250. |  |
| 95 | 279. |  |
| Decomposition temperature | 279. | 296. |
| Distillate | 95% | 85% |

Tar acids recovered by the vapor-extraction process described consist, in general, of the same class of substances as those obtained by the customary liquid extraction of tar oils, being principally phenol, cresols and xylenols and some higher boiling tar acids. The proportions of the individual tar acid constituents will vary depending upon the source of the material and the conditions of extraction. Usually about 25% or as much as 40% of the total tar acids present is phenol, the remainder being higher boiling tar acids.

The tar acids from vapor-extraction carbolate contain a higher percentage of distillable material than the tar acids from liquid-extraction carbolate, the tar acids being obtained from the same source and with the same percentage recovery of the total tar acids from the tar.

The acids recovered by vapor extraction are of a better quality than those recovered by extraction of liquid oils in that the residue on distillation of the acids liberated from vapor extraction carbolate, after freeing the same from neutral oil and water, is usually below 10%, whereas the similarly obtained residue on distillation of acids recovered by liquid extraction usually amounts to from 10 to 20%. The "distillation residue" is usually determined by distilling a 100 cc. sample of "liberated tar acids" to dryness, and subtracting the volume of distillate from the volume of the sample. The "liberated tar acids", obtained by acidifying carbolate and separating the acid layer contain oil and water in addition to tar acids, and these appear in the distillate when the liberated tar acids are distilled. The percentage of distillation residue based on dry crude tar acids may be calculated by correcting for oil and water in the liberated tar acids, separately determined. The lower percentage of distillation residue in the tar acids liberated from vapor-extraction carbolate may be due to the fact that carbolic oils, which are treated at a relatively low temperature (60-85° C.) with caustic solution for recovery of tar acids, are generally distilled over a temperature in excess of 200° C. whereas vapor-extraction carbolate is generally produced at temperatures below 200° C. At temperatures in excess of 200° C. a greater proportion of caustic-soluble materials is carried over which later appear as a higher distillation residue.

Solutions of caustic containing up to about 15% of caustic soda have previously been employed for the extraction of tar-acid bearing vapors. The evaporation of water from such dilute caustic solutions, however, cools the hot vapors considerably and a substantial amount of neutral oil is condensed during the extraction of the vapors. This necessitates the use of a separator or decanter to separate the carbolate and oils. The carbolate thus obtained will contain some dissolved neutral oils. According to this invention concentrated solutions of caustic are employed and they are preferably supplied hot for the extraction. By thus reducing the amount of water evaporated from the caustic only a limited amount of neutral oil is thrown down with the carbolate and the carbolate solutions thus produced contain a high percentage of tar acids and only a limited amount of water.

The extent to which the vapors are cooled while in contact with the caustic solution employed for the extraction depends in part upon the amount of water vapor present in the vapors being extracted and their temperature. If, for example, the tar is steam-distilled, the vapors treated may contain from 80 to 95% by volume of water vapor and they may be at a temperature of 150° C., the exact quantities being dependent upon the amount of steam used in the distillation and the boiling range of the tar acids it is desired to recover by this process. Less water will be evaporated from the caustic solution employed to extract these vapors than will be evaporated from the same caustic solution when employed at the same temperature (150° C.) to extract the vapors from an ordinary distillation without steam. Even without adding any steam in the distillation process, the moisture present in most tars (usually 2 to 5%) gives vapors containing about 50 to 70% by volume of water vapor at temperatures of about 175° C. to 200° C. Even though the vapors from the distillation contain a minimum of moisture, less water is evaporated from hot concentrated caustic solutions than from dilute solutions and there is consequently less tendency to condense neutral oils from the vapors than when cooler and moderately concentrated or dilute solutions are employed.

It is a preferred feature of this invention to supply for the extraction an aqueous solution of caustic at such concentration and temperature that, when brought into contact with the vapors to be extracted, the vapor pressure of water over the solution will be substantially the same as the partial pressure of water vapor in the vapors being extracted. The process of this invention is, however, not limited to the use of caustic solutions with the same vapor pressure as the partial pressure of water in the vapors treated. The use of concentrated solutions of caustic is preferable to the use of dilute solutions, even though the concentrated solutions do not have exactly the same vapor pressure as the vapor pressure of water in the vapors treated, because in general the vapor pressures of concentrated solutions are more nearly equal to that of the water in the vapors treated than are the vapor pressures of dilute solutions of caustic. Although concentrated solutions of caustic containing as low as 30% of sodium hydroxide may be employed for some extractions made according to this invention, in general, the use of caustic solutions containing more than 45% of sodium hydroxide is to be preferred. Commercial solutions containing between 47 and 50% of sodium hydroxide are available for this purpose. Higher concentrations may be secured by dissolving the requisite amount of solid caustic in water and maintaining the solution hot or by fortifying a commercial solution through the addition of solid caustic.

The extraction of vapors hotter than 200° C. with caustic solutions is generally difficult on a commercial scale, owing to the concentration of the caustic solution by such hot vapors and the separation of solid material from the concentrated solutions. Therefore, if the tar-acid containing vapors are at a temperature in excess of 200° C., they are preferably cooled to this temperature or lower before extracting, although it is possible and in some cases may be desirable to operate at temperatures in excess of 200° C.

It will be generally true, that the vapors to be extracted will be at a higher temperature than 150° C. While it is known that the lowest boiling member of the tar-acid group, viz., phenol, has a normal boiling point higher than this, yet owing to the presence of water in commercial tar, light oils containing appreciable quantities of tar acids will be vaporized at a temperature of 150° C. Furthermore, when tar is actively steam distilled by the addition of fresh steam, or distilled by the aid of inert gas, tar acids in the higher boiling range may be largely vaporized at a temperature of 150° C. or even lower, e. g., 120° C.

The extraction of the tar acids is advantageously carried out by a process in which the gases and caustic flow in a generally countercurrent direction. A bubble cap tower may be used in which the caustic flows over a series of plates in a tower, and the gases bubble through the caustic as it flows over the plates.

The extraction may be accomplished by a multi-stage process in which the gases and caustic pass through the various stages countercurrent to each other. In each stage a portion of the carbolate formed is recycled. Fresh caustic is continuously added to one stage of the extraction in which it blends with the carbolate produced therein and is recirculated in contact with the vapors. A portion of the resulting carbolate solution is continuously withdrawn to another stage, in which also a portion of the carbolate formed is recirculated and a part is withdrawn. By thus treating the gas in two or more steps, 90 to 95% or more of the tar acids in the vapors are converted to carbolate and 80 to 90% or more of the caustic soda is converted to carbolate. Such a continuous multi-stage extraction process is illustrated in the drawing, but the invention is not limited to the process there illustrated.

In the drawing a pipe still is shown which comprises the heater 1 and the vapor box 2. If coke-oven tar containing about 3% of water is heated in the heater and then flashed in the vapor box 2, tar-acid-containing vapors will pass from the vapor box through the vapor main 3 into the column 4, supplied with reflux from the partial condenser 5. From this column one or more oil fractions may be withdrawn and collected, as in the receiver 11. The vapors, which have been cooled to a temperature of about 200° C. or less, may contain as much as 40% or more of the tar acids originally present in the tar.

The vapors pass through the main 6 to the caustic extractor 7. A multi-stage caustic extractor is shown. Fresh caustic is fed into the extractor through the pipe 12. The caustic blends with the carbolate collecting in the bottom of the first stage of the extractor and the blend is circulated by the pump 13 through the line 14, through the heat interchanger 15 and sprayed into the vapors through the sprays 16. The carbolate formed is blended with fresh caustic from the pipe 12 and a part of it is resprayed into the gases while the balance flows to the other half of the extractor. It is blended with carbolate formed there, and this mixture is sprayed and resprayed into the vapors through the sprays 16'. The excess, that is, the product, is withdrawn through the overflow line 17. The main 6 and the caustic extractor 7 should be well insulated to minimize heat loss to the surroundings. However, there will be some heat formed by the neutralization of the tar acids with the caustic soda which will tend to offset this loss. As a further means of overcoming any heat losses the heat interchangers 15 and 15' are used. They serve to maintain the carbolate at a temperature approximating that of the vapor being treated and thus reduce condensation of neutral oil in the carbolate. By introducing 47–50%, or stronger, caustic solution through the pipe 12, respraying a part of the carbolate formed in the manner described, using multi-stage extraction of the vapors and heating the recycled carbolate, it is possible to convert 90 to 95% of the tar acid vapors to carbolate and form a carbolate containing over 45% and even as much as 65% of tar acids. The tar-acid content of the carbolate obtained varies principally with the temperature of production, being highest at high temperatures and lowest at the lower temperatures. The carbolate will contain excess caustic, usually as much as 3%, based on the weight of the carbolate, and often more than this.

The vapors after treatment in the caustic extractor may be passed to a condenser 9, which is shown as a total condenser. The condensate, which may contain less than 1% of tar acids, is collected in the receiver 10. By regulated extraction in the caustic extractor, e. g. when a carbolate of high phenol content is desired, only a portion of the tar acids may be recovered by extraction in the vapor phase.

Although the invention has been described more particularly as applied to a continuous distillation process, as, for example, in a pipe still, it may be applied to extracting the vapors resulting from other methods of tar distillation. For example, in a simple distillation the vapors may pass directly to the caustic extractor until such time as the temperature becomes too high for bringing them into direct contact with the caustic used for extraction. This will generally be about 200° C. Vapors coming off above this temperature may first be cooled to about 200° C. before passing to the caustic extractor.

It is not necessary in some distillations to employ the partial condenser before the caustic extractor if the vapors are at a temperature low enough to permit being brought into direct contact with caustic solution. Such, for example, may be the case when tar is steam distilled, or when heated for dehydration or for the removal of a small amount of oil. Or tar heated by use as a cooling medium in condensers connected with pipe stills or simple stills or stills in which tar is distilled by hot coke oven gases or other hot gases may flash into a vapor box and the vapors may be treated directly by caustic solutions.

The vapors leaving the caustic tower or a portion of them may be recirculated through the vapor box to increase the distillation of tar acids from the residue. Such a process is exemplified by the method described in the copending application of S. P. Miller, Serial No. 514,964, filed February 11, 1931.

Although the process has been described more particularly in connection with the distillation of coke-oven tar, it may be employed to produce carbolate solutions from other tar-acid and neutral oil containing hydrocarbon materials, such as gas-house tar, vertical retort tar, low temperature tar, etc., topped or dehydrated tar or low-melting, tar-acid containing pitches, etc.

I claim:

1. The method of recovering tar acids from a mixture of vapors comprising tar acid vapors and steam which comprises bringing into contact with the mixture of vapors an aqueous solution of an alkaline reagent which, at the temperature of the vapors, has a vapor pressure approximating that of the water in the vapors.

2. The method of recovering tar acids from tar-acid and neutral-oil-containing hydrocarbon material which comprises vaporizing tar acids and neutral oils from the hydrocarbon material, subjecting the vapors to intimate contact with a spray of caustic soda solution of sufficient strength and at a sufficiently high temperature to avoid condensation of neutral oils in excess of the amount soluble in the carbolate formed thereby removing tar acids from the vapors produced during the distillation, and subsequently condensing constituents which remain in the vapor form during the caustic soda extraction.

3. The method of recovering tar acids from a mixture of vapors, neutral oils comprising tar-acid vapors and steam which comprises bringing into contact with the mixture of vapors at a temperature of at least 120° C. an aqueous solution of an alkaline reagent which, at the temperature of the vapors, has a vapor pressure approximating that of the water in the vapors so that tar acids are converted to salts without condensation of neutral oils in excess of the amount soluble in the carbolate formed.

4. The method of recovering tar acids from tar-acid containing vapors which comprises spraying the vapors with a mixture of carbolate and caustic, blending caustic solution containing at least 30% of sodium hydroxide with a portion of the carbolate produced and bringing the mixture of carbolate and caustic into intimate contact with the vapors.

5. The method of recovering tar acids from tar-acid and neutral-oil-containing hydrocarbon material which comprises distilling the material and extracting tar acids from the resulting vapors containing tar acids and neutral oils in the vapor-phase by repeatedly bringing an aqueous solution containing caustic soda into contact with the vapors and renewing the alkalinity of the aqueous solution by adding thereto a solution of caustic containing at least 30% of sodium hydroxide.

6. The method of recovering tar acids from tar-acid and neutral-oil-containing hydrocarbon material which comprises distilling the material and extracting tar acids from the resulting vapors containing tar acids and neutral oils in the vapor-phase by repeatedly bringing an aqueous solution containing caustic soda into contact with the vapors and renewing the alkalinity of the aqueous solution by adding thereto a solution of caustic containing at least 45% of sodium hydroxide.

7. The method of recovering tar acids from tar in the form of carbolate which comprises distilling the tar and bringing into contact with the resulting neutral-oil and tar-acid vapors at a temperature of at least 120° C. a caustic solution containing at least 30% of sodium hydroxide.

8. The method of recovering tar acids from tar in the form of carbolate which comprises heating the tar and repeatedly bringing into contact with the resulting vapors containing tar acids and neutral oils at a temperature of at least 150° C. an aqueous solution containing caustic soda while continually renewing the aqueous solution by the addition thereto of caustic soda containing at least 30% of sodium hydroxide, the aqueous solution of caustic soda and the tar-acid containing vapors being brought into contact by being caused to flow countercurrent to one another.

9. The method of recovering tar acids from tar in the form of carbolate which comprises extracting tar acids at a temperature of 150–200° C. in the vapor-phase from a mixture of steam, neutral-oil and tar-acid vapors resulting from a distillation of the tar by bringing an alkaline solution into contact with the vapors, the alkalinity of the solution being produced by the use of a caustic solution containing at least 45% of sodium hydroxide.

10. The method of recovering tar acids from tar in the form of carbolate, which comprises introducing into contact with the neutral-oil and tar-acid vapors resulting from the distillation of the tar, a solution of caustic containing at least 45% of sodium hydroxide.

11. The method of recovering tar acids from a mixture containing tar-acid and neutral oil vapors which comprises spraying said mixture of vapors with a mixture of carbolate and caustic, blending caustic solution containing at least 30% of sodium hydroxide with at least a portion of the carbolate produced and repeatedly bringing at least a portion of the blended caustic and carbolate in contact with the mixture of vapors in a cyclic process.

12. The method of recovering tar acids from a mixture of vapors comprising tar acid vapors and neutral oils which comprises bringing into contact with the mixture of vapors an aqueous solution of an alkaline reagent at a temperature of at least 120° C. at which the tar acids are absorbed in the alkaline reagent without condensation of neutral oils in excess of the amount soluble in the carbolate formed.

EDWARD H. ELLMS.

CERTIFICATE OF CORRECTION.

Patent No. 2,040,084. May 12, 1936.

EDWARD H. ELLMS.

It is hereby certified that error appears in the printed specification of the above numbered patent requiring correction as follows: Page 4, first column, line 55, claim 1, after "vapors" second occurrence, insert the comma and words , neutral oil vapors; line 75, claim 3, strike out the comma and words ", neutral oils " and insert the same after "vapors", column 2, line 1, claim 3; same page, second column, line 10, claim 4, after "from" insert the words "a mixture of" and line 11, same claim, for "containing" read and neutral oil; and that the said Letters Patent should be read with these corrections therein that the same may conform to the record of the case in the Patent Office.

Signed and sealed this 4th day of August, A. D. 1936.

Henry Van Arsdale (Seal)    Acting Commissioner of Patents.